(12) United States Patent
Kobussen et al.

(10) Patent No.: US 11,160,297 B2
(45) Date of Patent: Nov. 2, 2021

(54) METHOD TO PROCESS COEXTRUDED MEAT PRODUCTS USING HIGH VELOCITY AIR IN COMBINATION WITH HANDLING METHOD AND LIQUID APPLICATION

(71) Applicant: CoextrusionSolutions, LLC, Ankeny, IA (US)

(72) Inventors: Jozinus Johannus Jacobus Petrus Kobussen, Ankeny, IA (US); Tony J. Haun, Ankeny, IA (US)

(73) Assignee: CoextrusionSolutions, LLC, Ankeny, IA (US)

( * ) Notice: Subject to any disclaimer, the term of this patent is extended or adjusted under 35 U.S.C. 154(b) by 322 days.

(21) Appl. No.: 15/774,526

(22) PCT Filed: Nov. 8, 2016

(86) PCT No.: PCT/US2016/060970
§ 371 (c)(1),
(2) Date: May 8, 2018

(87) PCT Pub. No.: WO2017/083292
PCT Pub. Date: May 18, 2017

(65) Prior Publication Data
US 2020/0120943 A1    Apr. 23, 2020

Related U.S. Application Data

(60) Provisional application No. 62/254,938, filed on Nov. 13, 2015.

(51) Int. Cl.
*A23P 30/25* (2016.01)
*A23L 13/60* (2016.01)
(Continued)

(52) U.S. Cl.
CPC .............. *A23L 5/17* (2016.08); *A22C 11/006* (2013.01); *A22C 11/02* (2013.01); *A22C 11/10* (2013.01);
(Continued)

(58) Field of Classification Search
CPC ..... A22C 13/0003; A22C 11/008; A23L 5/17; A23L 13/67; A23B 4/0526; A47J 37/00; A47J 37/0641; F24C 15/322
See application file for complete search history.

(56) References Cited

U.S. PATENT DOCUMENTS 2,828,686 A * 4/1958 Nelems ................. A47J 37/042
99/427
3,223,530 A    12/1965 Weprin
(Continued)

FOREIGN PATENT DOCUMENTS

| EP | 0379755 A1 | 8/1990 |
| GB | 987603 A | 3/1965 |
| WO | 9960870 A1 | 12/1999 |

OTHER PUBLICATIONS

International Search Report and Written Opinion issued in corresponding International Application No. PCT/US16/60970, dated Jan. 13, 2017, 18 pages.

*Primary Examiner* — Jeffrey P Mornhinweg
*Assistant Examiner* — Kelly P Kershaw
(74) *Attorney, Agent, or Firm* — Quarles & Brady LLP (57) ABSTRACT

A system and method for processing a coextruded meat product including a casing enclosing a meat batter after brining in which a heated, high velocity air stream is applied
(Continued)

to the coextruded meat product thereby mechanically removing moisture from a surface of the casing and cooking the coextruded meat product. This system and method can further improve the ability for a liquid coating to be added to the coextruded meat product in a non-drenching manner because of the superior surface preparation of the casing by the jets.

35 Claims, 7 Drawing Sheets

(51) Int. Cl.
*A23L 5/10* (2016.01)
*A22C 11/00* (2006.01)
*A22C 11/02* (2006.01)
*A22C 11/10* (2006.01)
*A22C 13/00* (2006.01)
*A23B 4/052* (2006.01)

(52) U.S. Cl.
CPC ........ *A22C 13/0003* (2013.01); *A23B 4/0526* (2013.01); *A22C 13/0026* (2013.01); *A22C 2013/0023* (2013.01); *A23V 2002/00* (2013.01)

(56) References Cited

U.S. PATENT DOCUMENTS

| | | | |
|---|---|---|---|
| 3,615,585 A * | 10/1971 | Clemens | A22C 11/008 426/465 |
| 3,896,242 A | 7/1975 | Moore | |
| 4,723,482 A * | 2/1988 | Weiss | A47J 37/041 99/397 |
| 5,211,106 A | 5/1993 | Lucke | |
| 5,271,948 A | 12/1993 | Boni et al. | |
| 6,331,104 B1 | 12/2001 | Kobussen et al. | |
| 6,524,633 B2 | 2/2003 | Rainbolt et al. | |
| 2008/0241325 A1 | 10/2008 | Reijers | |
| 2009/0220655 A1 | 9/2009 | Longo Areso et al. | |
| 2015/0230514 A1* | 8/2015 | Bontjer | A22C 11/001 426/277 |

* cited by examiner

METHOD TO PROCESS COEXTRUDED MEAT PRODUCTS USING HIGH VELOCITY AIR IN COMBINATION WITH HANDLING METHOD AND LIQUID APPLICATION

CROSS-REFERENCE TO RELATED APPLICATIONS

This application represents the U.S. national stage entry of International Application No. PCT/US2016/060970 filed Nov. 8, 2016, which claims the benefit of U.S. Provisional Patent Application No. 62/254,938 filed on Nov. 13, 2015, the contents of which are incorporated by reference herein in their entirety for all purposes.

FIELD OF THE INVENTION

This disclosure relates to methods and systems for the production of sausages. More specifically, this application relates to methods and systems for conditioning coextruded sausages in a cooking environment using high velocity, precisely-directed heated air to dry and cook the sausages. The method of handling may also provide a process to apply smoke coloring or other liquid coatings to the sausages.

BACKGROUND

Conventionally, many sausages are mass-produced using coextrusion systems in which a casing and a meat dough are simultaneously extruded into a continuous tube-like form with the meat dough or product received in the surrounding casing. The coextruded casing is then brined to coagulate the casing and cut and crimped to form discrete sausages or links. The sausages are then conditioned and cooked using heated air at relatively low air speeds to remove moisture from the sausage casing and to cook the sausages.

In regards to the conditioning and cooking, conditioning and cooking can be a slow process and often requires a very large oven to achieve the desired quality requirements. Furthermore, the systems used in conventional conditioning and cooking are often very energy inefficient in part because they often require that dried intake air be brought continuously into the oven to dry the products sufficiently while cooking. Effectively this means that as the air in the oven is heated, the air becomes humid and then must be replaced with cooler dry air.

SUMMARY

Disclosed herein are improved methods and systems of conditioning and cooking coextruded sausages. Among other things, these methods and systems permit for the sausages to be conditioned and cooked in much shorter times than were believed to be possible and in such a way that the cooking and conditioning is more energy efficient than in conventional cooking and conditioning. Still yet, the disclosed methods and systems provide a faster, simpler, smaller and more economical design for conditioning and cooking coextruded sausages than conventional methods and systems.

Still yet, these methods and systems enable liquid smoke or other liquid coatings to be applied to coextruded sausages in a manner that is precisely measured and directed thereby resulting, for example, in better color and flavor development and less usage of liquid smoke than was previously possible.

According to one aspect, a method of processing a coextruded meat product including a casing enclosing a meat batter after brining is disclosed. The method comprises applying a heated, high velocity air stream to the coextruded meat product, thereby mechanically removing moisture from a surface of the casing and cooking the coextruded meat product.

In some forms, the method may further include the step of applying a liquid coating, such as liquid smoke, to the surface of the casing of the coextruded meat product after the step of applying the heated, high velocity air stream to the coextruded meat product. The step of applying the liquid coating to the surface of the casing of the coextruded meat product may be performed by spraying the liquid coating onto the surface using, for example, ink jet technology.

In some forms, after the step of applying the liquid coating to the surface of the casing of the coextruded meat product, the method may include another step of applying a heated, high velocity air stream to the coextruded meat product.

It is contemplated that, in some forms, the step of steps of applying the heated, high velocity air stream to the coextruded meat product and the step of applying the liquid coating of the coextruded meat product may be in a range of 8 to 10 minutes.

In some forms, the step of applying the heated, high velocity air stream to the coextruded meat product may involve varying at least one of the temperature, velocity, and humidity of the air stream over a duration of the step.

In some forms, the air being applied to the coextruded meat product at the step of applying the heated, high velocity air stream to the coextruded meat product may not be controlled prior to application to remove moisture from the air.

In some forms, the step of applying a heated, high velocity air stream to the coextruded meat product may cook and condition the coextruded meat product.

In some forms, before the step of applying the high velocity air to the coextruded meat product, the method may further include coextruding a meat batter into a casing to form a sausage rope, brining the sausage rope to coagulate the casing, and crimping and/or cutting the sausage rope to form the coextruded meat product.

In some forms, before the step of applying the high velocity air to the coextruded meat product, the method may include the step of loading the coextruded meat product into a slot having at least one opening formed therein to accommodate the flow of air through the slot. In this case, the step of applying the high velocity air to the coextruded meat product may effectuate the rotation of the coextruded meat product within the slot.

In some forms, the air velocity of the heated, high velocity air stream may be up to 3000 meters per minute air velocity per jet. In some forms, heated, high velocity air stream may have a velocity above 7.5 meters per section and may fall within a range of 7.5 to 50 meters per second.

In some forms, the heated, high velocity air may increase a core temperature of the coextruded meat product in a range of 4° C. to 24° C. to a temperature in a range of 40° C. to 60° C.

In some forms, the coextruded meat product may be subjected to between five and twenty separate treatment cells and each treatment cell may provide between 15 to 170 air changes per minute.

According to another aspect, a system for processing a coextruded meat product including a casing enclosing a meat batter after brining is disclosed. The system includes a thermal system adapted to convey the coextruded meat product through the system. The thermal system includes one or more high velocity air jets for applying a heated, high velocity air stream to the coextruded meat product in an amount capable of mechanically removing moisture from a surface of the casing and cooking the coextruded meat product.

In some forms, the thermal system may further include a thermal wheel, which may be drum-like in shape, comprising a plurality of slots configured to receive sausages therein which may be disposed on the outer circumference thereof. The thermal wheel may be rotatable to move the slots past the high velocity air jet(s). The system may also further include another thermal wheel with another plurality of slots configured to receive sausages therein and the other thermal wheel may be rotatable to move the other slots past another high velocity air jet or jets. This system may also further include an applicator that is disposed between the thermal wheels and may be adapted to apply liquid coating, such as liquid smoke, to the surface of the casing of the coextruded meat product. This applicator may spray the liquid coating and, in some preferred forms, may utilize ink jet technology in order to apply liquid coating. It is contemplated that the system may transport a given coextruded sausage product through the thermal wheel, the applicator, and the other thermal wheel in a time range of between 8 and 10 minutes.

In some forms, there may be a plurality of high velocity air jets (i.e., more than one jet) that are spaced apart from one another around at least a portion of the circumference of the thermal wheel. These high velocity air jets may be configured to each provide respective heated, high velocity air streams, at least some of which have at least one of different velocities, different temperatures, and different humidities from one another, thereby defining a plurality of treatment cells around the circumference of the thermal wheel.

Still yet, in some forms, each of the plurality of slots have one or more opening therein to permit a passage of the heated, high velocity air stream through the opening(s) to accommodate a lifting and/or rotation of the coextruded meat product in the plurality of slots. Among other things, this may result in a more evenly cooked and conditioned coextruded meat product.

In some forms, the high velocity air jet(s) may be configured to provide a variable amount of at least one of velocity, temperature, and humidity in order to vary an air stream emitted from the respective high velocity air jet over a duration of time.

In some forms, the system may not remove moisture from a source of air prior to using the source of air in the heated, high velocity air stream from the at least one high velocity air jet. Put another way, preconditioning of the air might be avoided based on the methodology for using it during the process.

In some forms, the system may further include the upstream coextruded meat product forming components such as a coextruder, a briner, and a crimper and/or cutter mechanism which are configured to prepare the coextruded meat product prior to processing the coextruded meat product in the thermal system.

In some forms, the air velocity of the heated, high velocity air stream from the at least one high velocity air jet may be up to 3000 meters per minute air velocity per jet. In some forms, heated, high velocity air stream may have a velocity above 7.5 meters per section and may fall within a range of 7.5 to 50 meters per second.

In some forms, the heated, high velocity air from the at least one high velocity air jet may increases a core temperature of the coextruded meat product in a range of 4° C. to 24° C. to a temperature in a range of 40° C. to 60° C.

In some forms, the system may provide between five and twenty separate treatment cells and each treatment cell may be capable of providing between 15 to 170 air changes per minute.

The disclosed system and method provide a new, more efficient scheme for preparing coextruded meat products. Among other things, the surface of the casing can be robustly prepared for the application of liquid smoke (or other liquid coatings) by the mechanical removal of moisture instead of by the use of evaporation alone (which takes more time and energy). This enables the use of more efficient liquid smoke application methodologies (i.e., spraying instead of drenching or full immersion which can have more spillage and waste). It also permits for the whole preparation process to be reduced in time by significant amounts.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
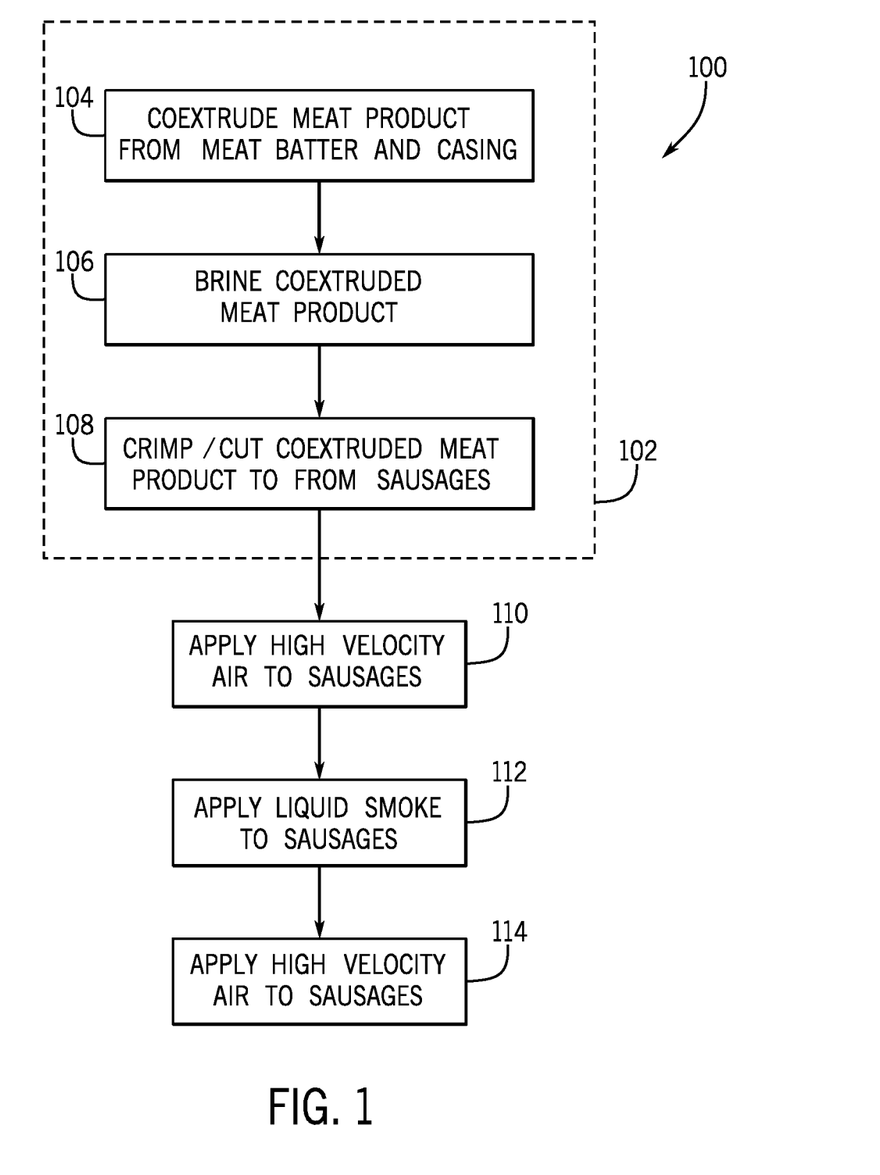
FIG. 1 is a block diagram illustrating the steps of an exemplary method for producing a coextruded meat product.
Figure 2:
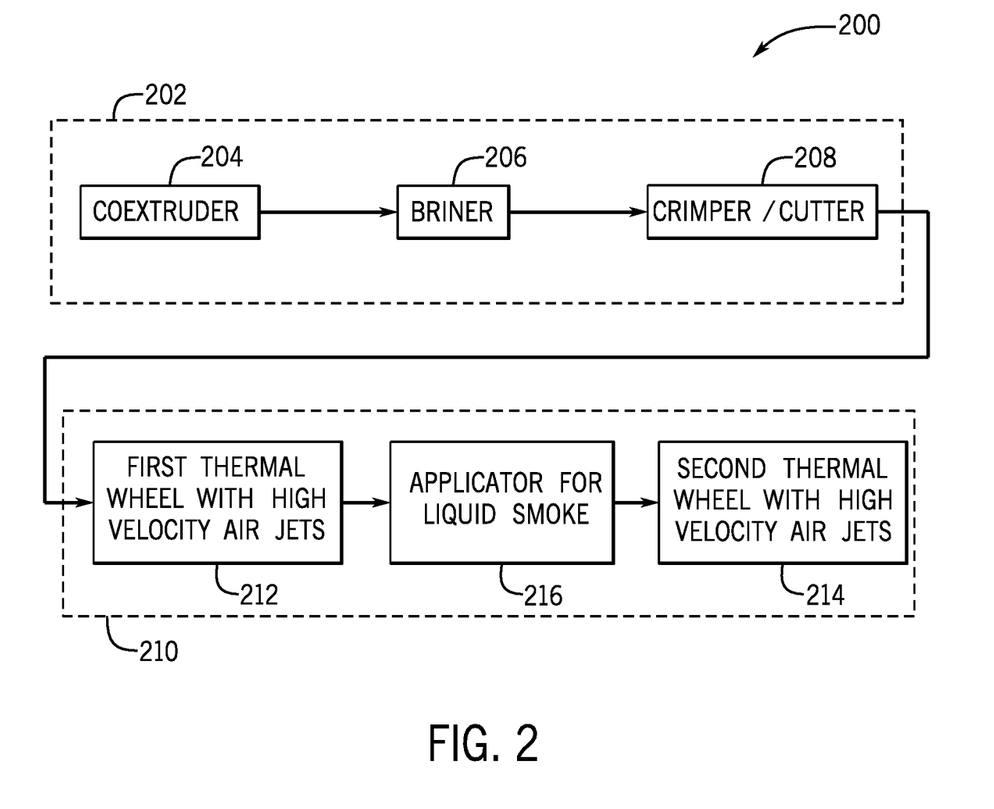
FIG. 2 is a block diagram illustrating a system for performing the method illustrated in FIG. 1.

Referring first to FIGS. 1 and 2, a schematic is illustrated showing a method 100 for the production of a coextruded meat product (for example, a sausage or link) using a system 200. Initially, a series of steps 102 are performed for initially forming the separate sausages or links using link-making devices 202. First, according to step 104, a meat batter and a casing are coextruded with one another using a coextruder 204 to form the coextruded meat product which, at this stage, is a continuous sausage rope. Next, according to step 106, that coextruded meat product is brined in a briner 206 to initially coagulate the casing to maintain the integrity of the sausage rope. The brined sausage rope or coextruded meat product is then crimped and/or cut according to step 108 in a crimper/cutter 208 to separate the sausage rope into a plurality of discrete sausages, links, or sausage links, terms which will be used interchangeable herein.

One having ordinary skill in the art will appreciate that the general description of the formation steps 102 of the link and the link-making devices 202 are well known in the art and that there are various ways that the above steps may be performed or potentially modified. For this reason, it should be understood that these steps, while exemplary, are not the only way of initially forming the sausage or links.

Returning now to the method 100, after the initial formation steps 102 have been performed, the individual sausage links, which are still raw, can then be transferred into a thermal system 210 for conditioning and cooking the sausages. In one exemplary form, the thermal system 210 may include two rotating wheels 212 and 214, including a first wheel such as wheel 212 illustrated in FIGS. 2 through 4, that are each fitted with horizontal carriers to hold the sausages through the thermal process. Between these two rotating wheels 212 and 214, an applicator 216 for the application of a liquid coating such as, for example, liquid smoke may be present. As used herein, "liquid coating" as described in conjunction with an applicator is used to liquid based coatings of various kinds for adding coloration and/or flavoring to the sausages or coextruded products. As some non-limiting examples, liquid coatings can include liquid smoke, dyed fluid (e.g., a red-dyed fluid), fluid containing flavors or spices, or so forth. It is also contemplated that one of the thermal wheels or the applicator might be omitted from the process without deviating from the general inventive concept or that the dual wheel and applicator design may be replaced with other designs to implement the steps described herein.

Figure 3:
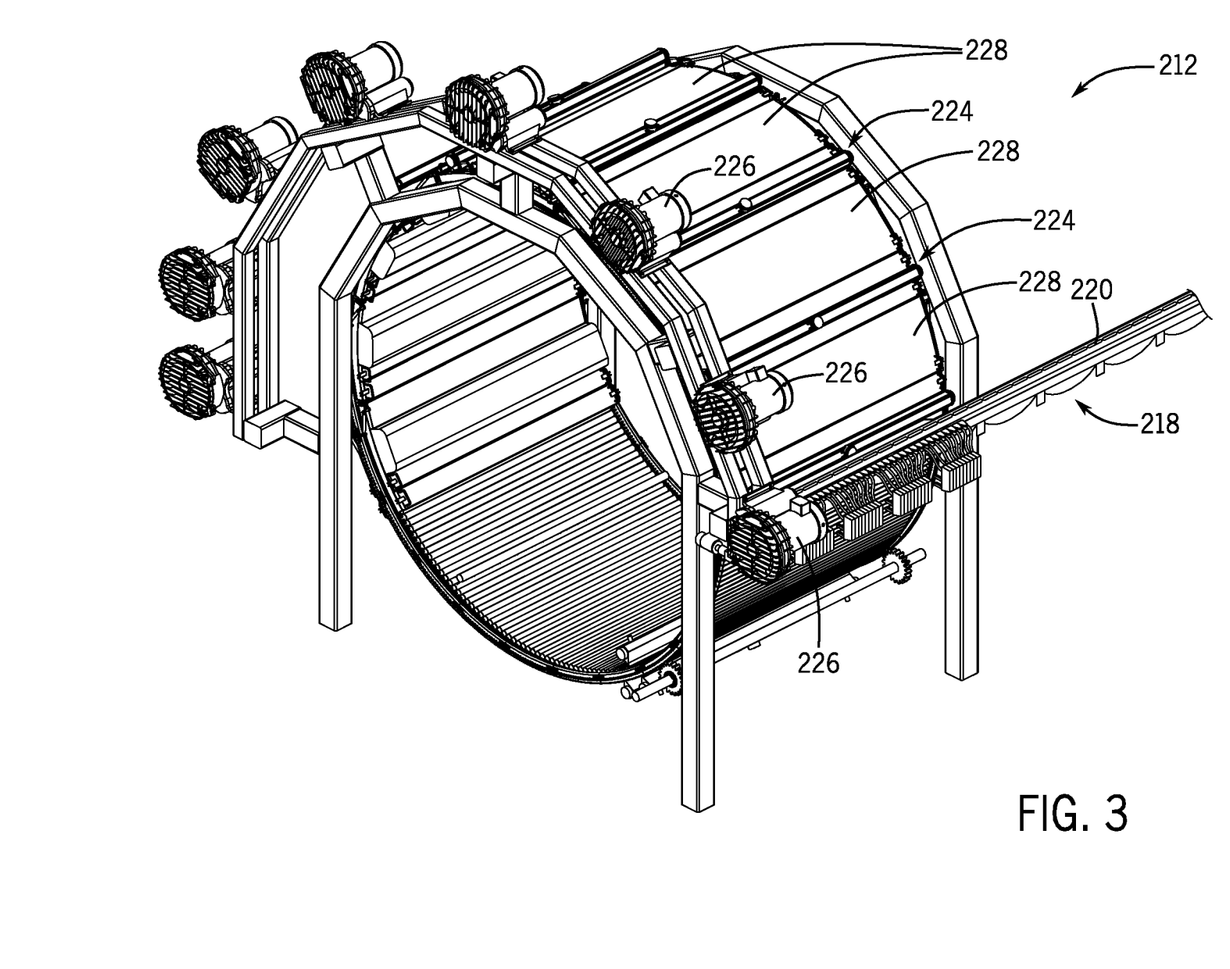
FIG. 3 is a thermal wheel from the exemplary system of FIG. 2 for partially performing the method of FIG. 1 in which the thermal wheel is capable of presenting high velocity air to the coextruded meat product.
Figure 4:
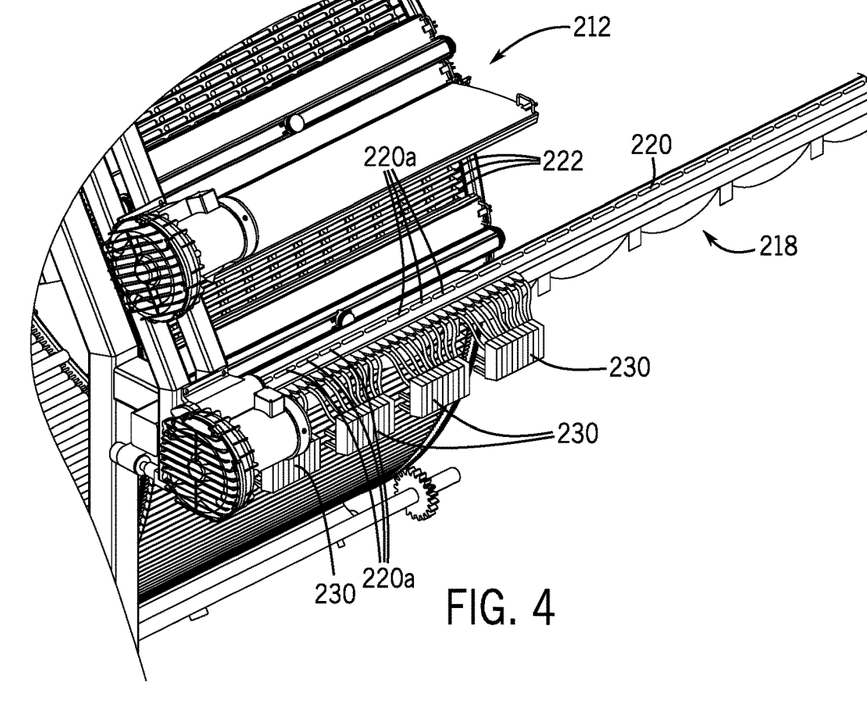
FIG. 4 is a detailed view of the thermal wheel of FIG. 3 in which the wheel for holding the coextruded meat product is visible without the blower system or thermal shields, but in which a feed conveyor is illustrated.

As best illustrated in FIGS. 3 and 4, the first thermal wheel 212 is illustrated with a feed conveyor 218 carrying the separated sausage links 220 in series to the thermal wheel 212 along a line parallel, but offset from the central axis of the thermal wheel.

Figure 5:
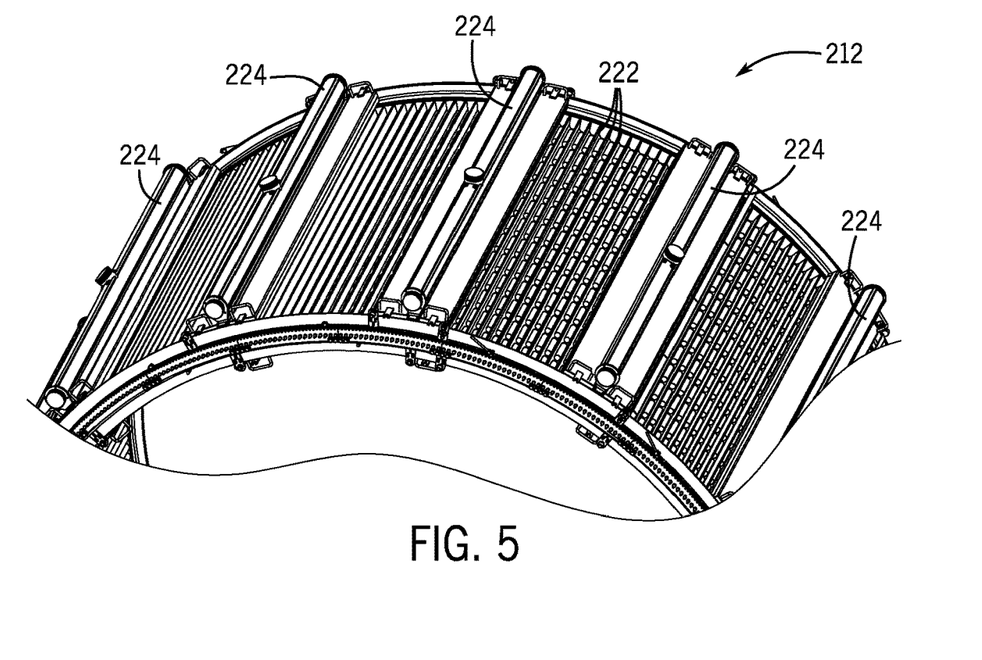
FIG. 5 is a detailed view of a portion of the thermal wheel in which the wheel for holding the coextruded meat product is visible with only the conduits or jets for the presentation of high velocity air being illustrated thereon.

As best depicted in FIGS. 4 and 5, the first thermal wheel 212 includes a plurality of U-shaped sausage-receiving slots 222. Each of these sausage-receiving slots 222 extend horizontally along a lengthwise direction of the wheel 212 and open to a radially outward facing side of the wheel 212. The individual members of the plurality of U-shaped sausage-receiving slots 222 are arranged circumferentially around the wheel 212 and are angularly offset from one another such that they form a series of infinitely parallel rows as the wheel 212 rotates. In the particular form shown, there are approximately two hundred forty U-shaped sausage-receiving slots 222.

As can be seen in FIG. 5, the wheel 212 has a plurality of high velocity air jets 224 angularly spaced about the outside of the circumference of the portion of the wheel 212 containing the U-shaped sausage-receiving slots 222. These high velocity air jets 224 are connected to a plurality of hot air blowers 226, best seen in the full view of FIG. 3, such that a series of cells are created in which air may be controllably blown over the sausages received in the U-shaped sausage-receiving slots 222 as the U-shaped sausage-receiving slots 222 rotate past the high velocity air jets 224 when the wheel 212 turns.

As can be best seen in FIG. 3, a plurality of shields 228 are positioned between each of the high velocity air jets 224 to retain the sausages in the slots 222 and to direct air flow from the jets 224.

In operation, after the raw sausages 220 are prepared, they are transported along the feed conveyor 218 until a subset 220a of sausage links 220 are positioned adjacent to the first thermal wheel 212. When the subset 220a substantially span the axial width of the wheel, one or more actuators may displace or push the subset 220a of sausage links 220 from the feed conveyor 218 into an adjacently positioned one of the axially extending slots 222 on the first thermal wheel 212. One or more loading mechanisms 230 then push or move the subset of sausages into the respective slot 222. The wheel 212 rotates about its central axis to introduce the sausages 220 into the region of the jets 224 and, as the wheel rotates, the next vacant slot 222 is lifted to the level of the feed conveyor 218 so that a subsequent subset of sausages can be introduced to the next slot 222. This rotation and loading continues as long as the system 200 continues to run.

As they travel in the wheel 212, the sausages 220 are conditioned and cooked by the various independent heating and drying cells in the thermal wheel 212 by the application of high velocity air at step 110 of the method 100. The sausages 220 may be subjected to at least five but possibly as many twenty or more of these treatment cells or cells. Each cell may be specifically designed and fitted with impingement type air nozzles or jets 224 that precisely direct heated air at high velocities onto the sausages 220 to condition the surface and to start cooking the otherwise raw sausages 220. Further, it will be appreciated that each of the various independent treatment cells or cells may provide, potentially, varied treatment conditions. For example, as the sausages 220 travel through various cells different ones of the high velocity air jets 224 may provide air at different temperatures, flow rates, and/or humidity (humidity may be determined in part by other variables of the manner in which the gases flow by the sausages 220). Among other things, by drying the surface of the sausages 220, the surface can be better conditioned for absorbing liquid coatings such as liquid smoke for proper color development and coagulation the proteins can be promoted.

It should be appreciated that traditional furnaces and ovens for drying sausages or coextruded meat products typically contain one large open volume and do not include multiple cells. This means the furnace gas might readily migrate throughout and it is difficult, if not impossible, to regulate conditions in one zone to be different from the others. For example, as moisture evaporates from sausages in on region of the furnace, the moisture will raise the dew point in the gas the fills the entire space. In this way, traditional ovens and furnaces for drying and cooking are often very poorly controlled or restricted in the manner in which can provide processing conditions.

In contrast, the air nozzles or jets may be strategically placed in each cell to precisely direct the air onto the sausages and discretely and individually control the processing conditions in each respective cell. The very high air speeds from the nozzles can facilitate the maximum amount of air exchanges at the surface of the sausages. Each cell may be able to subject the sausages from 0 to 170 air changes per minute. In contrast, conventional ovens can only reach 15 air changes per minute. Further, each cell may have its air refreshed with makeup air which is temperature conditioned to remove excess moisture and maintain optimum drying conditions. This makeup air may be drawn from outside the thermal wheel and may be temperature-conditioned through a heat exchanger. However, it will be appreciated that the air need not be conditioned in all applications or in all cells.

The air nozzles or jets may produce up to 3000 meters per minute air velocity per nozzle. Instead of evaporating the moisture from the product surface, the moisture is mechanically displaced into the airstream. The air may be heated to raise the product temperature above the dew point temperature, thereby increasing the drying rate of the collagen casing gel that encases the sausage products. The heated high velocity air can further increase the product core temperature from a range of 4° C. to 24° C. to a temperature at which the meat dough is sufficiently coagulated. Typical core temperatures achieved after drying and cooking have been found to be in the range of 40° C. to 60° C. but can typically be 52° C. In some forms, heated, high velocity air stream may have a velocity above 7.5 meters per section and may fall within a range of 7.5 to 50 meters per second. Of course, it will be appreciated that the velocities may differ in different cells, may by cycled within a single cell, or that one or more of the cells may occasionally have a velocity below that range. However, it is contemplated that at least one of the cells can operate at a higher than traditional velocity (i.e., above 7.5 meters per second) for at least some duration of the cycle to perform the functions described herein to the sausages.

Due to the high air speeds and elevated temperatures, the moisture amount that the air contains may be significantly higher than in conventional oven systems, while still facilitating a drying effect on the product. This can eliminate the convention requirement that moisture is removed before the introduction of air into the oven or cooking apparatus. Put another way, the air introduced to the sausage does not require pre-removal of moisture before introduction of the air to the environment in which the sausages are cooked and conditioned (although, it is contemplated that in some forms, pre-removal of moisture might still be employed as noted above). This can eliminate the separate, conventional step of refrigerating the air to remove moisture which is typical in conventional systems. This may result in a much more energy efficient process for conditioning and cooking the coextruded sausages.

Further, due to the high airspeeds and resulting air exchanges at the surface of the sausages, the processing times may be greatly reduced. Whereas typical systems have pre-drying, liquid smoking, and post-drying that typically take between 16 and 30 minutes of processing time. Using the high velocity air cooking and conditioning described herein, it has been found that processing times of typically 8 minutes, but no longer than 10 minutes may be achieved. The reduced processing times result in a much smaller oven footprint than was heretofore possible.

Further, by employing high air velocity directly onto the sausages 220, the sausages 220 may be suspended in their slots or carriers 222 and may even be rotated therein to promote even cooking and conditioning of the whole sausage surface. In contrast, in conventional sausage cooking systems, the sausages need to be mechanically rotated to avoid touching marks to the carrier surfaces.

Returning now to the illustrated embodiment in which the sausages are received in one of the slots 222, the wheel 212 rotates to transport the sausages 220 past various ones of the high velocity air jets 224 to expose the sausages 220 to high velocity air (supplied by the blowers 226) according to step 110. Further to the description above, each blower 226 can be equipped with a heating source that allows the air to be heated to the desired temperature. Also, each blower 226 can be equipped with a moisture removal system to allow an even more rapid drying rate where required. Accordingly, the high velocity air may be heated to a degree that is also sufficient to cook the raw sausage 220 prior to downstream processing and packaging. Again, the high velocity air can be directed at the sausages 220 in such a manner that the moisture on the casing of the sausages 220 is not merely evaporated (as is the case in a traditional oven), but the jets of high velocity air are able to mechanically remove the moisture from the surface of the casing which can then be transferred from the air stream out of the wheel 212.

For optimal processing, the sausages 220 may have different conditions applied to them through each step of the process and, in particular during the cooking/conditioning stage. Multiple cells in the thermal wheel 212 permit the sausages to be presented with this level of precise treatment through the process. With each cell having an independent blower mounted to it, these blowers can generate the precise airspeed for the sausages at that the specific time in the process. For example, very high airspeeds can be generated to facilitate rapid heat and moisture transfer.

Figure 6:
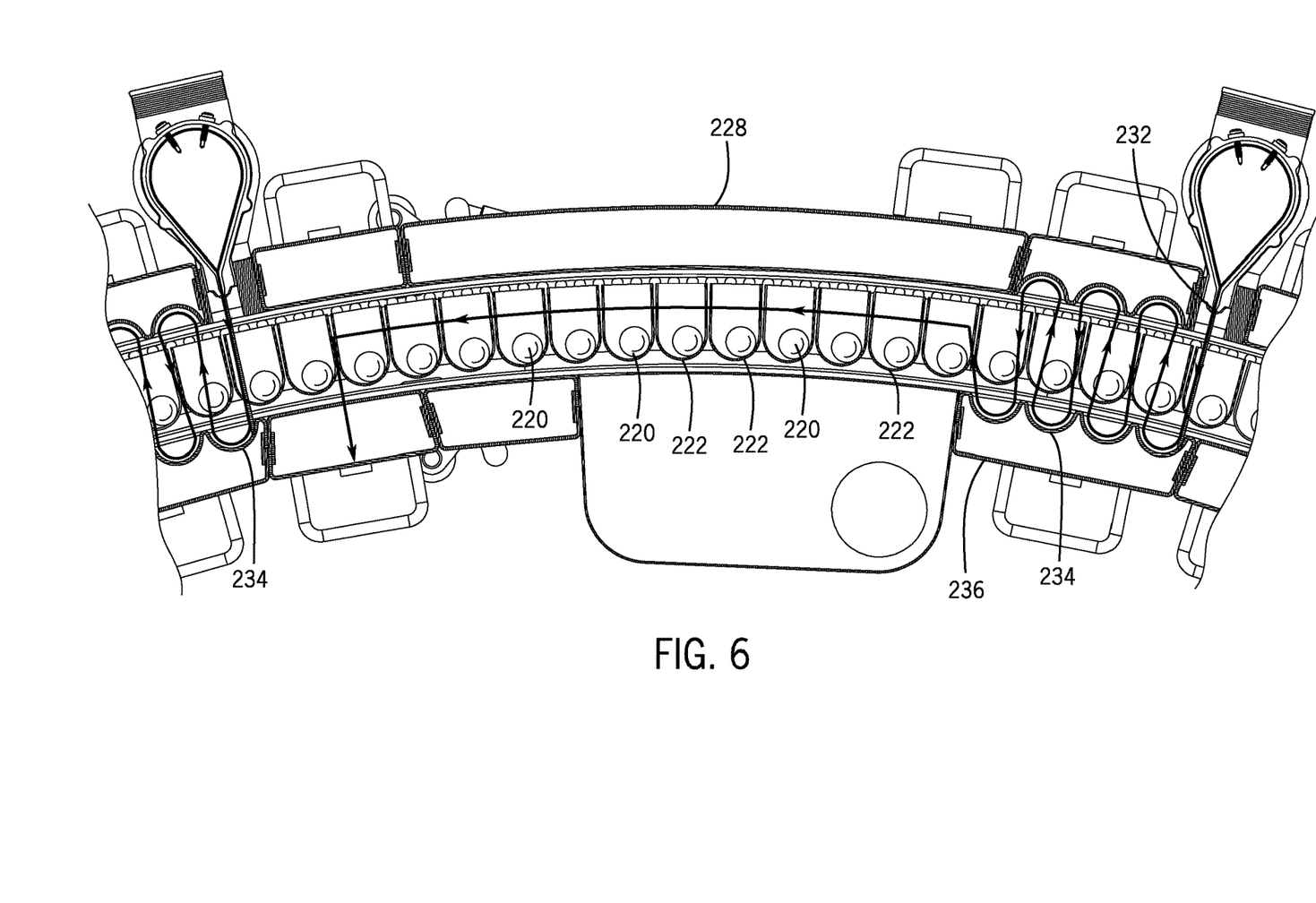
FIG. 6 is a detailed cross-sectional schematic illustrating the principle of how the presentation of high velocity air into the thermal wheel can be used to condition, rotate, lift, and cook the coextruded meat product.

With reference being made to the illustration of principle in FIG. 6, the conditioned air from the blowers 226 of the blower system is forced through an air knife, nozzles, or jets 224 at, for example, a supply slot 232 into the cell and directed straight onto the rows of sausages 220 as the sausages 220 travel along the wheel 212. The slots 222 where the sausages are received and transported in may be of a mesh design that allows the high velocity air to pass through the carrier slots 222 and bounce back from a curved reflecting surface 234 mounted just underneath the air knife. This causes an upward airflow that allows the sausages 220 to move upward from the surface of the carrier/slot 222 and facilitates even conditioning of the total sausage surface. The upper shield 228 may also be curved such that reflected gas can be directed back downward. There can also be a return slot 236 formed in one of the lower/inner wall and the upper/outer wall that permits for the air/gas to be evacuated from the cell, often under suction, and this same air may be recycled through the particular cell and potentially subject to processing before re-introduction into the cooking/drying area of the cell. In this way, moisture entrained in the air/gas can be removed from the inter-wall space and the vicinity of the sausages 220.

Figure 7:
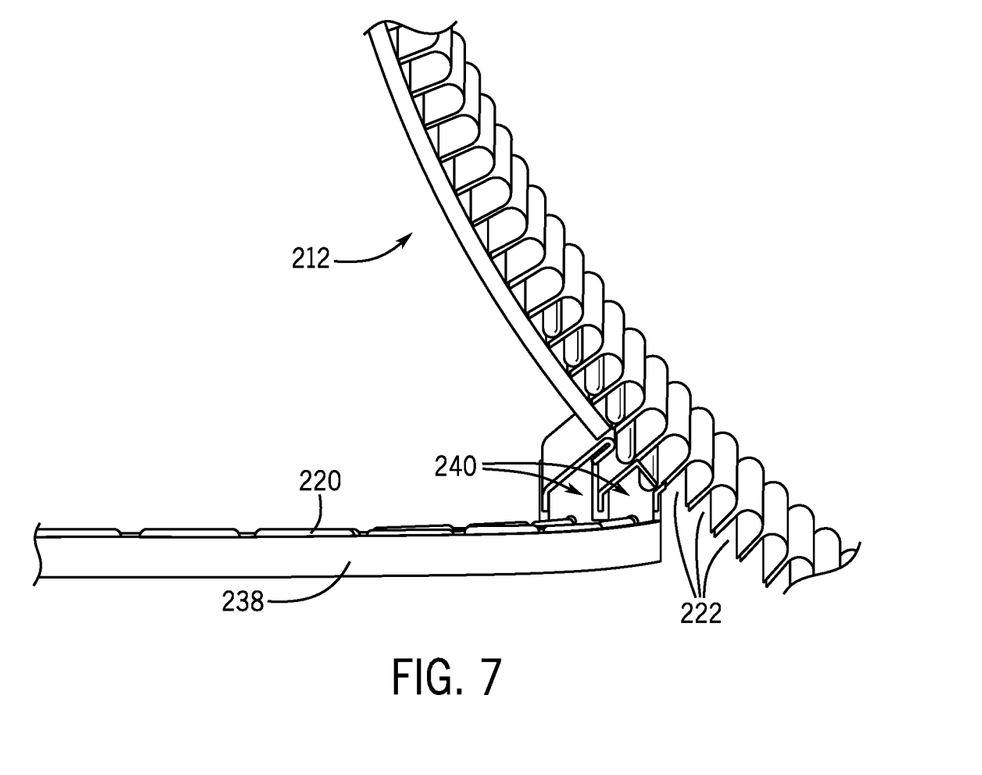
FIG. 7 is a detailed side view of the unloading end of the thermal wheel of FIG. 3 in which the coextruded meat products are transported to another conveying line.

After the sausages 220 are properly conditioned to the optimal conditions for temperature and surface dryness, the sausages 220 may exit the thermal wheel 212 as depicted in FIG. 7 onto a take away conveyor 238. As illustrated, when the slot 222 containing the sausages 220 on the wheel 212 rotates beyond a certain rotational angle, the slots 222 may align with exit chutes 240 and the sausages 220 may fall under gravity onto the take away conveyor 238.

After exiting the first thermal wheel 212, the sausages may be presented to the applicator 216 for the application of a liquid coating according to step 112 before being loaded onto the second thermal wheel 214. This applicator 216 may, for example, subject the sausages 220 to a liquid smoke treatment. Precisely mounted spray nozzles, inkjet, video jet or the like, can spray a precise amount of liquid smoke or other liquid coatings onto the surface of each sausage to color and flavor them.

Figure 8:
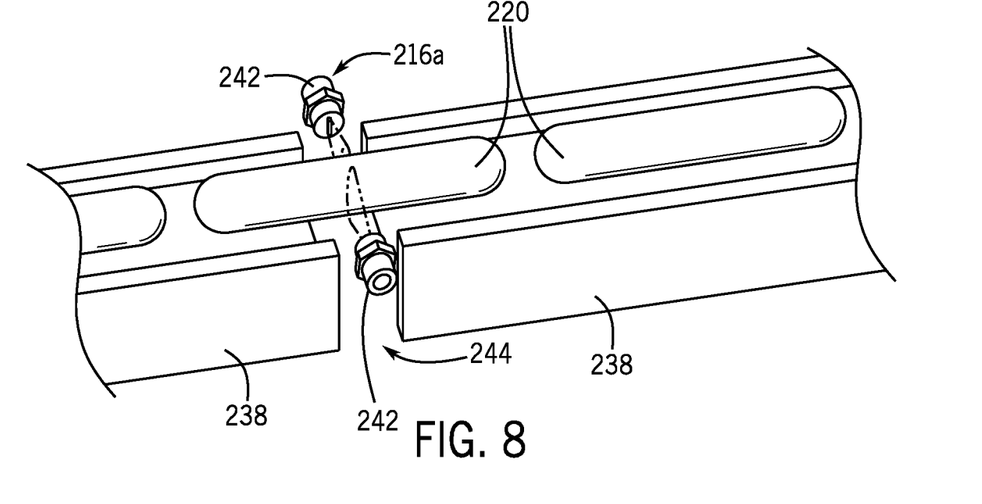
FIG. 8 is a detailed perspective view of a portion of the conveying line downstream of the unloading end of the thermal wheel in which liquid smoke is applied to the coextruded meat product.
Figure 9:
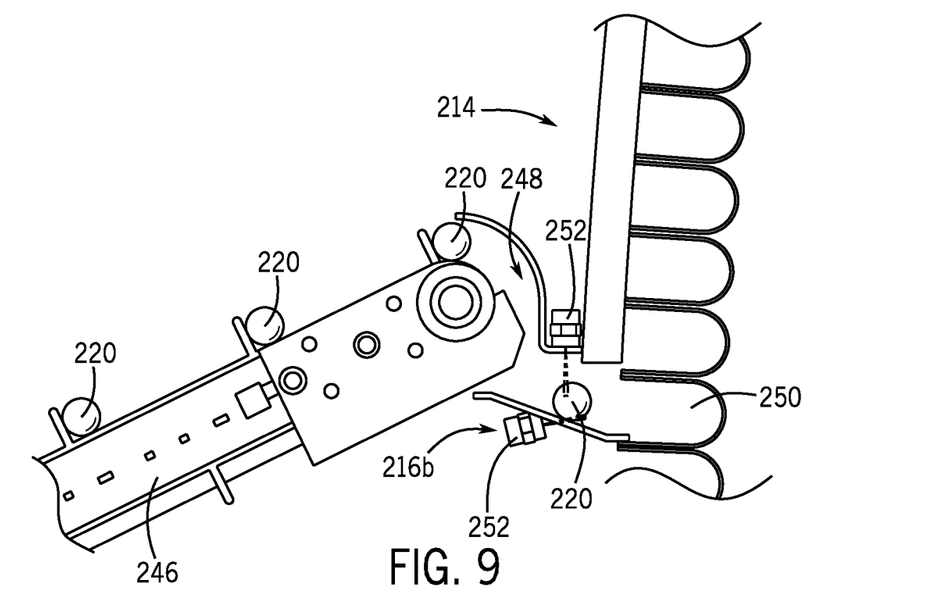
FIG. 9 is a side view of a first alternative mechanism for the application of liquid smoke to the coextruded meat product at the loading end of a second thermal wheel in which the coextruded meat product passes by the liquid smoke applicators in a chute arrangement.
Figure 10:
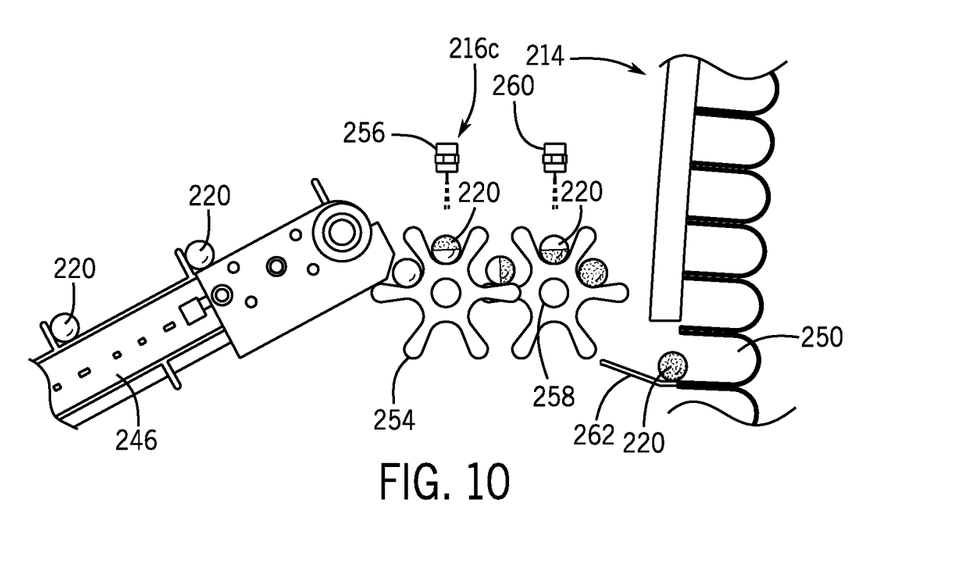
FIG. 10 is a side view of a second alternative mechanism for the application of liquid smoke to the coextruded meat product at the unloading end of the thermal wheel in which the coextruded meat product passes by the liquid smoke applicators in a transfer roller arrangement.

This liquid applicator 216 can be mounted on the conveyor 238 as depicted in FIG. 8, at the infeed of the second thermal wheel 214 as depicted in the alternatives of FIGS. 9 and 10, or even within the second thermal wheel 214.

In some forms, because the surface of the sausage is so dry in comparison to conventional techniques, the application of liquids using ink jet coloring technology to color and flavor the co-extruded sausages may be used. This method of application permits the liquid to be precisely applied in a manner that minimizes the usage of the liquid and also applies the exact amount to impart the desired color and/or flavor. In contrast, conventional systems typically use drench systems which are very wasteful and cause color and other quality defects.

Looking now specifically at FIG. 8, as depicted in FIG. 8, in some forms of the system 200, once the sausages 220 fall onto the take away conveyor 238 as illustrated in FIG. 7, the sausages 220 may then be conveyed across an in-conveyor applicator 216a. As illustrated, the in-conveyor applicator 216a can include two or more applicators, which in the form illustrated are two opposing spray nozzles 242 which spray the liquid coating (e.g., liquid smoke) onto the coextruded meat product 220 (i.e., the sausage) at a gap 244 between two sections of the conveyor 238 over which the sausage 220 is conveyed. By applying the liquid coating in this gap 244 using sprayers, the excess liquid may be collected below the conveyor. This may be very efficient in comparison to techniques which rely upon the drenching of the sausages in a bath of liquid. The coated sausages can then be conveyed to a second thermal wheel 214 (substantially similar to the first thermal wheel 212) according to a step 114 to dry the liquid coating and further cook the sausages.

As depicted in FIGS. 9 and 10, alternative applicators 216b and 216c are shown which coat the sausages 220 in a liquid coating (such as liquid smoke) just before the sausages 220 are loaded into the second thermal wheel 214.

As shown in FIG. 9, an inclined conveyor 246 with supports lifts the sausages into a curved loading chute 248 which loads the sausages 220 into one of the horizontal rows 250 in the second thermal wheel 214. As the sausages 220 descend the chute 248 and roll into the slots 250, one or more sprayers or brushes 252 are positioned to apply the liquid coating to the sausages 220 in the applicator 216b.

An alternative applicator 216c depicted in FIG. 10, there again is an inclined lift 246 that drops the sausages 220 into a first rotating transfer roller 254 with a plurality of spokes and recesses. Above the transfer roller 254, a first sprayer 256 is positioned that applies a liquid coating to the sausages 220 received in one of the recesses of the transfer roller 254. The first transfer roller 254 may transmit the sausages 220 into a second transfer roller 258 which transports the sausage 220 past a second sprayer 260 which applies a liquid coating to a surface or side of the sausage 220 that may not have been exposed to the liquid coating well at the first sprayer 256 based on the orientation of the sausage 220 in the roller 254. The second transfer roller 258 may then rotate to a position in which the sprayed sausages 220 can fall onto a platform 262 that directs the sausages into the slots 250 of the second thermal wheel 214.

Again, in the second wheel 214, the sausages 220, now coated with the liquid coating may be exposed to high velocity air jets to further dry the liquid coating and cook the sausages 220 before packaging.

Thus, an improved system and method are disclosed that permit for sausages or any coextruded meat product to be conditioned and cooked in much shorter times that was believed to be possible and in such a way that the cooking and conditioning is more energy efficient than in conventional cooking and conditioning. The methods and systems provide a faster, simpler, smaller and more economical design for conditioning and cooking coextruded sausages that conventional methods and systems and enable liquid smoke (or other liquid coatings) to be applied to coextruded sausages in a manner that is precisely measured and directed thereby resulting in better color and flavor development and less usage of liquid smoke (or other coatings) than was previously possible.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of processing a plurality of coextruded meat products each including a casing enclosing a meat batter after brining, the method comprising:
   receiving the coextruded meat products in a plurality of slots in a thermal wheel in which each of the slots receiving the coextruded meat products receives multiple ones of the coextruded meat products therein and the slots each have at least one opening formed therein to accommodate a flow of air through the slots;
   rotating the thermal wheel to move the coextruded meat products in the slots past at least one high velocity air jet; and
   applying a heated, high velocity air stream to the coextruded meat products, thereby mechanically removing moisture from a surface of the casing, cooking the coextruded meat products, and effectuating at least one of a lifting and a rotation of the coextruded meat products within the slots;
   wherein, after initially being applied to the coextruded meat products and flowing through the at least one opening in one of the slots, the heated, high velocity air stream contacts a reflecting surface and is re-directed back towards the coextruded meat products.

2. The method of claim 1, further comprising the step of applying a liquid coating to the surface of the casing of the coextruded meat products after the step of applying the heated, high velocity air stream to the coextruded meat products.

3. The method of claim 2, wherein the liquid coating is liquid smoke.

4. The method of claim 2, wherein the step of applying the liquid coating to the surface of the casing of the coextruded meat products is performed by spraying the liquid coating onto the surface.

5. The method of claim 4, wherein the step of applying the liquid coating of the coextruded meat products involves using an ink jet technology to spray on the liquid coating.

6. The method of claim 2, further comprising another step of applying a heated, high velocity air stream to the coextruded meat products after the step of applying the liquid coating to the surface of the casing of the coextruded meat products.

7. The method of claim 6, wherein the step of steps of applying the heated, high velocity air stream to the coextruded meat products and the step of applying the liquid coating of the coextruded meat products are in a range of 8 to 10 minutes.

8. The method of claim 1, wherein the step of applying the heated, high velocity air stream to the coextruded meat products involves varying at least one of the temperature, velocity, and humidity of the air stream over a duration of the step.

9. The method of claim 1, wherein the air being applied to the coextruded meat products at the step of applying the heated, high velocity air stream to the coextruded meat products is not controlled prior to application to remove moisture therefrom.

10. The method of claim 1, wherein the step of applying a heated, high velocity air stream to the coextruded meat products cooks and conditions the coextruded meat products.

11. The method of claim 1, further comprising, before the step of applying the high velocity air to the coextruded meat products:
coextruding a meat batter into a casing to form a sausage rope;
brining the sausage rope to coagulate the casing; and
crimping and cutting the sausage rope to form the coextruded meat products.

12. The method of claim 1, wherein the air velocity of the heated, high velocity air stream is up to 3000 meters per minute air velocity per jet.

13. The method of claim 1, wherein the heated, high velocity air increases a core temperature of the coextruded meat products in a range of 4° C. to 24° C. to a temperature in a range of 40° C. to 60° C.

14. The method of claim 1, wherein the coextruded meat products are subjected to between five and twenty separate treatment cells.

15. The method of claim 14, wherein each treatment cell provides between 15 to 170 air changes per minute.

16. A system for processing a plurality of coextruded meat products each including a casing enclosing a meat batter after brining, the system comprising:
a thermal system adapted to convey the coextruded meat products therethrough, the thermal system including at least one high velocity air jet for applying a heated, high velocity air stream to the coextruded meat products in an amount capable of mechanically removing moisture from a surface of the casing and cooking the coextruded meat products;
wherein the thermal system further includes a thermal wheel comprising a plurality of slots in which each of the slots is configured to receive multiple ones of the coextruded meat products therein, with the slots each having at least one opening formed therein to accommodate a flow of air through the slots; and
wherein the thermal wheel is rotatable to move the slots past at least one high velocity air jet, the at least one high velocity air jet applies the heated, high velocity air stream to the coextruded meat products to mechanically remove moisture from a surface of the casing, cook the coextruded meat products, and effectuate the rotation of the coextruded meat products within the slot and is further configured such that, after initially being applied to the coextruded meat products and flowing through the at least one opening in one of the slots, the heated, high velocity air stream contacts a reflecting surface and is re-directed back towards the coextruded meat products.

17. The system of claim 16, wherein the system further comprises a second thermal wheel comprising another plurality of slots configured to receive the coextruded meat products therein in which the second thermal wheel is rotatable to move the other slots past at least another one of the at least one high velocity air jets and wherein the system further comprises an applicator that is disposed between the first thermal wheel and the second thermal wheel and is adapted to apply a liquid coating to the surface of the casing of the coextruded meat products.

18. The system of claim 17, wherein the liquid coating is liquid smoke.

19. The system of claim 17, wherein the system transports a given coextruded meat products through the thermal wheel, the applicator, and the other thermal wheel in a time range of between 8 and 10 minutes.

20. The system of claim 17, wherein the applicator utilizes ink jet technology in order to apply the liquid coating.

21. The system of claim 16, wherein the at least one high velocity air jet includes a plurality of high velocity air jets and the plurality of high velocity air jets are spaced apart from one another around at least a portion of the circumference of the thermal wheel.

22. The system of claim 21, where the plurality of high velocity air jets are configured to provide respective heated, high velocity air streams at least some of which have at least one of different velocities, different temperatures, and different humidities from one another, thereby defining a plurality of treatment cells around the circumference of the thermal wheel.

23. The system of claim 16, wherein the at least one high velocity air jet is configured to provide a variable amount of at least one of velocity, temperature, and humidity in order to vary an air stream emitted from the at least one high velocity air jet over a duration of time.

24. The system of claim 16, wherein the system does not remove moisture from a source of air prior to using the source of air in the heated, high velocity air stream from the at least one high velocity air jet.

25. The system of claim 16, the system further comprising a coextruder, a briner, and a crimper and/or cutter mechanism configured to prepare the coextruded meat products prior to processing the coextruded meat products in the thermal system.

26. The system of claim 16, wherein the air velocity of the heated, high velocity air stream from the at least one high velocity air jet is up to 3000 meters per minute air velocity per jet.

27. The system of claim 16, wherein the heated, high velocity air from the at least one high velocity air jet increases a core temperature of the coextruded meat products in a range of 4° C. to 24° C. to a temperature in a range of 40° C. to 60° C.

28. The system of claim 16, wherein the system provides between five and twenty separate treatment cells.

29. The system of claim 28, wherein each treatment cell is capable of providing between 15 to 170 air changes per minute.

30. The method of claim 1, wherein the slots carrying the coextruded meat products are arranged circumferentially around the thermal wheel and are angularly offset from one another such that they form a series of infinitely parallel rows as the thermal wheel rotates.

31. The system of claim 16, wherein the slots configured to carry the coextruded meat products are arranged circumferentially around the thermal wheel and are angularly offset from one another such that they form a series of infinitely parallel rows as the thermal wheel rotates.

32. The method of claim 1, wherein in each of the slots receiving the coextruded meat products, the coextruded meat products are arranged in a single linear row within the respective slot.

33. The system of claim 16, wherein in each of the slots receiving the coextruded meat products, the coextruded meat products are arranged in a single linear row within the respective slot.

34. The method of claim 1, wherein after the heated, high velocity air stream contacts the reflecting surface and is re-directed back towards the coextruded meat products, the heated, high velocity air stream further contacts another reflecting surface to further re-direct the heated, high velocity air stream and produce a serpentine flow path for the heated, high velocity air stream.

35. The system of claim 16, wherein after the heated, high velocity air stream contacts the reflecting surface and is re-directed back towards the coextruded meat products, the heated, high velocity air stream further contacts another reflecting surface to further re-direct the heated, high velocity air stream and produce a serpentine flow path for the heated, high velocity air stream.

\* \* \* \* \*